United States Patent
Bier et al.

(10) Patent No.: US 7,562,085 B2
(45) Date of Patent: Jul. 14, 2009

(54) SYSTEMS AND METHODS FOR DISPLAYING LINKED INFORMATION IN A SORTED CONTEXT

(75) Inventors: Eric Allan Bier, Palo Alto, CA (US); Adam Perer, College Park, MD (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 542 days.

(21) Appl. No.: 11/136,255

(22) Filed: May 24, 2005

(65) Prior Publication Data
US 2006/0271883 A1    Nov. 30, 2006

(51) Int. Cl.
*G06F 7/00*    (2006.01)
*G06F 17/00*    (2006.01)
(52) U.S. Cl. .................. 707/101; 707/100; 715/200
(58) Field of Classification Search .......... 707/101–102
See application file for complete search history.

(56) References Cited

U.S. PATENT DOCUMENTS

| | | | | |
|---|---|---|---|---|
| 5,642,502 | A | * | 6/1997 | Driscoll ..................... 707/5 |
| 5,644,740 | A | * | 7/1997 | Kiuchi ..................... 715/853 |
| 5,670,984 | A | | 9/1997 | Robertson et al. |
| 5,786,820 | A | | 7/1998 | Robertson |
| 5,826,261 | A | * | 10/1998 | Spencer ..................... 707/5 |
| 5,867,164 | A | | 2/1999 | Bornstein et al. |
| 5,933,822 | A | * | 8/1999 | Braden-Harder et al. ....... 707/5 |
| 5,983,170 | A | * | 11/1999 | Goodman ..................... 704/9 |
| 6,094,648 | A | | 7/2000 | Aalbersberg |
| 6,189,019 | B1 | * | 2/2001 | Blumer et al. ............... 715/205 |
| 6,208,345 | B1 | * | 3/2001 | Sheard et al. ............... 715/853 |
| 6,246,442 | B1 | | 6/2001 | Harada et al. |
| 6,279,018 | B1 | | 8/2001 | Kudrolli et al. |

(Continued)

FOREIGN PATENT DOCUMENTS

EP    0 977 154 A2    2/2000

OTHER PUBLICATIONS

E. Bier et al., U.S. Patent Application entitled Systems and Methods for Semantically Zooming Information, filed May 24, 2005.
European Patent Office Search Report.

*Primary Examiner*—Jean M Corrielus
*Assistant Examiner*—Mohammed R Uddin
(74) *Attorney, Agent, or Firm*—Patrick J. S. Inouye; Krista A. Wittman

(57) ABSTRACT

Techniques are presented for determining a first set of display elements, each display element associated with a first display characteristic. An interesting element in the first set of display elements is determined. A second set of elements related to the interesting element is determined. A third set of elements based on the first and second set of elements is determined using intersection, union, subtraction addition and other logical operations. A third set of elements not yet added to the element collection is determined. The elements in the third set are associated with a second or ghosted display characteristic. The elements in the third set are inserted within the sorted context of the visualization based on spatial distortion rules which help to preserve spatial memory cues in the visualization of the element collection. The elements may be documents in an information repository, linked contact information, linked information records in a database or other types of information.

65 Claims, 16 Drawing Sheets

U.S. PATENT DOCUMENTS

| | | |
|---|---|---|
| 6,289,342 B1 | 9/2001 | Lawrence et al. |
| 6,300,947 B1 | 10/2001 | Kanevsky |
| 6,341,169 B1 * | 1/2002 | Cadorette et al. ........... 382/115 |
| 6,344,851 B1 | 2/2002 | Roberts |
| 6,452,597 B1 | 9/2002 | Goldberg et al. |
| 6,523,040 B1 | 2/2003 | Lo et al. |
| 6,745,183 B2 * | 6/2004 | Nishioka et al. ................ 707/5 |
| 6,857,102 B1 | 2/2005 | Bickmore et al. |
| 6,877,135 B1 * | 4/2005 | Kamiwada et al. .......... 715/210 |
| 7,003,442 B1 * | 2/2006 | Tsuda ............................ 704/9 |
| 7,003,513 B2 | 2/2006 | Geiselhart |
| 7,054,878 B2 * | 5/2006 | Gottsman et al. ........... 707/101 |
| 7,058,653 B2 * | 6/2006 | Okamoto et al. ............ 707/102 |
| 7,058,883 B1 * | 6/2006 | Oda ........................... 715/206 |
| 7,068,288 B1 | 6/2006 | Good et al. |
| 7,143,362 B2 | 11/2006 | Dieberger et al. |
| 7,165,264 B1 | 1/2007 | Westrick |
| 7,260,607 B2 | 8/2007 | Aktas et al. |
| 7,266,783 B2 * | 9/2007 | Fujita et al. ................. 715/848 |
| 7,269,787 B2 * | 9/2007 | Amitay et al. .............. 715/230 |
| 7,315,988 B2 | 1/2008 | Cragun et al. |
| 2002/0059333 A1 * | 5/2002 | Tribbeck .................... 707/500 |
| 2002/0128993 A1 * | 9/2002 | Jevons et al. .................. 707/1 |
| 2003/0028560 A1 | 2/2003 | Kudrolli et al. |
| 2003/0063094 A1 | 4/2003 | Smith |
| 2003/0074350 A1 * | 4/2003 | Tsuda ........................... 707/3 |
| 2003/0074366 A1 * | 4/2003 | Shibanuma et al. ......... 707/102 |
| 2003/0128212 A1 | 7/2003 | Pitkow |
| 2003/0132944 A1 | 7/2003 | Smith |
| 2003/0159113 A1 | 8/2003 | Bederson et al. |
| 2004/0034770 A1 * | 2/2004 | Kaler et al. .................. 713/155 |
| 2004/0100509 A1 | 5/2004 | Sommerer et al. |
| 2004/0139077 A1 * | 7/2004 | Banker ........................ 707/10 |
| 2004/0165010 A1 | 8/2004 | Robertson et al. |
| 2004/0205042 A1 * | 10/2004 | Ritter et al. .................... 707/2 |
| 2004/0205457 A1 | 10/2004 | Bent et al. |
| 2004/0268393 A1 | 12/2004 | Hunleth et al. |
| 2005/0005241 A1 | 1/2005 | Hunleth et al. |
| 2005/0060343 A1 * | 3/2005 | Gottsman et al. ........... 707/102 |
| 2005/0086259 A1 | 4/2005 | Eschbach et al. |
| 2005/0154637 A1 | 7/2005 | Nair et al. |
| 2005/0216186 A1 * | 9/2005 | Dorfman et al. ............. 701/207 |
| 2006/0085743 A1 | 4/2006 | Baudisch et al. |
| 2006/0179032 A1 * | 8/2006 | Gottsman et al. .............. 707/1 |
| 2007/0150807 A1 * | 6/2007 | Harrington .................. 715/523 |
| 2007/0288841 A1 | 12/2007 | Rohrabaugh et al. |

* cited by examiner

| SET | ELEMENTS | NORMAL MODE DISPLAY CHARACTERISTIC | GHOSTED MODE DISPLAY CHARACTERISTIC |
|---|---|---|---|
| S1 | SMITH 04, SMOLLAR 04, BIER 03, YEE 03 | NORMAL | N/A |
| S2 | YEE 03, JETTA 03, JANSSEN 98 | N/A | N/A |
| S3=S2-S1 | JETTA 03, JANSSEN 98 | N/A | GHOSTED |
| S4=S1 ∩ S2 | BEER 03, YEE 03 | NORMAL | HIGHLIGHTED |
| S5=S1-S2 | SMITH 04, SMOLLAR 04 | NORMAL | DIMMED |
| S6=SELECTED ELEMENTS | YEE 03 | NORMAL | SELECTED |

FIG. 14

SYSTEMS AND METHODS FOR DISPLAYING LINKED INFORMATION IN A SORTED CONTEXT

This invention was made with Government support under MDA904-03-C-0404 awarded by ARDA. The Government has certain rights in this invention.

This Application is related to: entitled "SYSTEMS AND METHODS FOR SEMANTICALLY ZOOMING INFORMATION" by Eric A. BIER et al., filed on an even date herewith, as U.S. patent application Ser. No.: 11/136,276, herein incorporated by reference in its entirety.

BACKGROUND OF THE INVENTION

1. Field of Invention

This invention relates to the display of information.

2. Description of Related Art

Conventional document management systems allow users to identify and manipulate quantities of relevant information. However these conventional text and web search systems do not allow the user to visualize the effect of adding newly found documents to the collection. Moreover, these systems lack adequate facilities for comparing the attributes of newly found documents with the attributes of documents already in the collection. Some conventional systems, such as web search engines provide users with an ability to review documents associated with a search. The user browses the links between documents to find other potentially useful documents. However, these conventional search systems also lack facilities to visualize the effect of adding newly found documents to a document collection. Moreover, interesting linked or connected documents are not easily integrated with user specified spatial organizations of the document collection.

SUMMARY OF THE INVENTION

Thus, systems and methods for displaying linked information within a sorted display context would be useful. The systems and methods according to this invention provide for determining a first set of user-interface elements in a first sorted display context, each element representing a document, a uniform resource locator, a citation, an information record in a database, linked contact information, or other types of information elements. Each element in the first set is associated with a first display characteristic. An interesting element in the first set of elements is optionally determined. A second set of elements related to or linked from the interesting element is then determined. A third set of elements is formed based on all the second set elements except those second set elements also present in the first set. The third set reflects elements not yet added to the sorted display context. The elements in the third set are associated with a second or ghosted display characteristic. The elements in the third set are inserted into the first display context based on spatial distortion rules which preferentially preserve spatial memory cues. A fourth set of elements is determined from the intersection of the first and second sets of elements. The fourth set of elements is associated with a third highlighted display characteristic. A fifth set is determined by subtracting the second set from the first set. The fifth set reflects elements in the first display context un-related to or not linked from the interesting element. The fifth set is associated with a fourth display characteristic. The one or more interesting elements are associated with a sixth set and associated with a fifth or selected display characteristic.

BRIEF DESCRIPTION OF THE DRAWINGS

FIG. 14 is an exemplary data structure for storing display characteristics according to this invention;

DETAILED DESCRIPTION OF EXEMPLARY EMBODIMENTS

Figure 1:
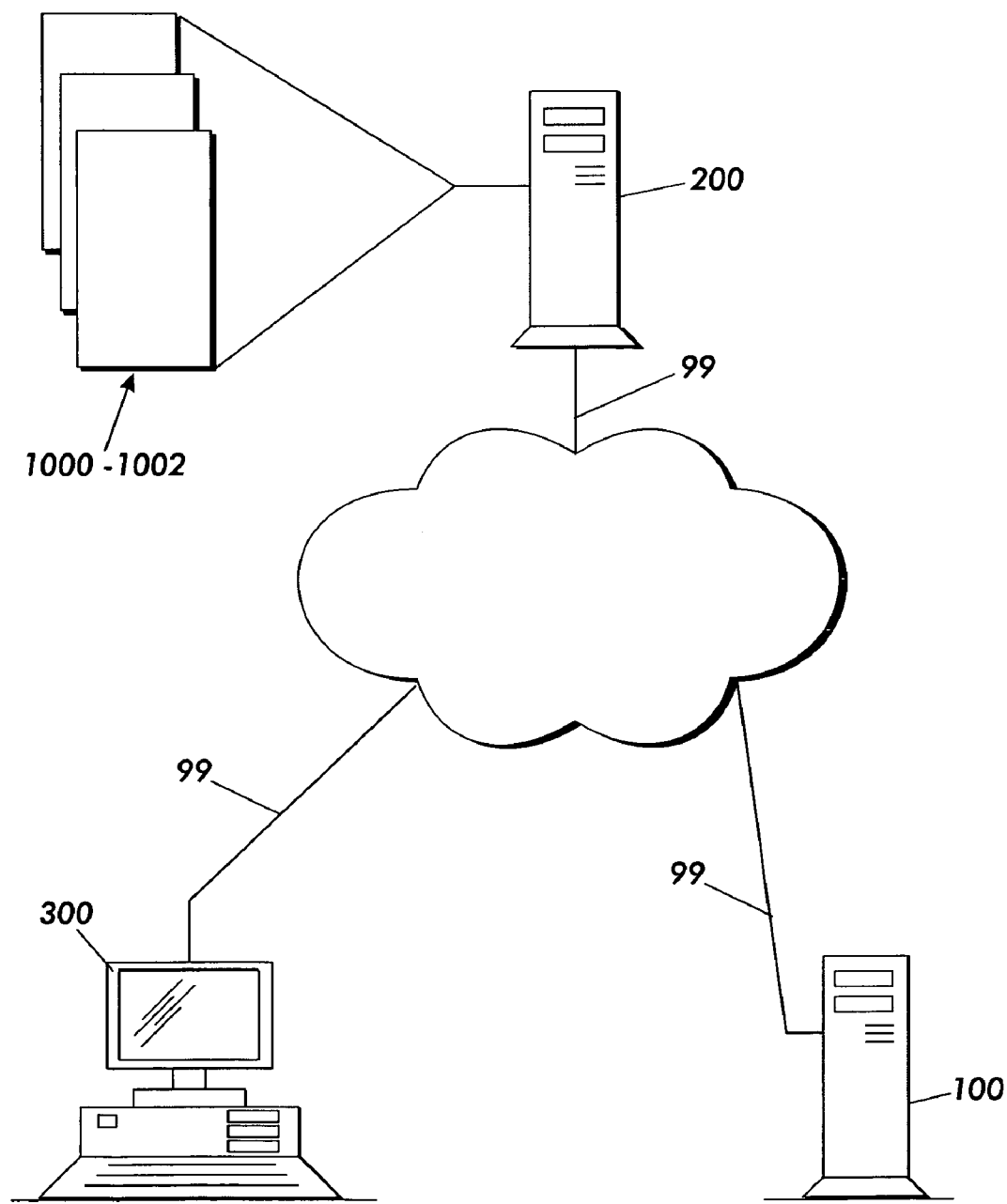
FIG. 1 is an overview of an exemplary system for displaying linked information in a sorted context according to this invention.

FIG. 1 is an overview of an exemplary system for displaying linked information in a sorted context 100 according to this invention. A system for displaying linked information in a sorted context 100 is connected via communications links 99 to a communications-enabled personal computer 300; and an information repository 200 serving documents 1000-1002.

A user of the communications-enabled personal computer 300 initiates a request for a visualization of a set of documents 1001-1002. The request is forwarded over communications link 99 to the system for displaying linked information in a sorted context 100 which mediates access to the information repository 200. The system for displaying linked information in a sorted context 100 retrieves the document 1001-1002 from the information repository 200. Each document is represented by a user interface element such as an icon, a thumbnail, a window, a tile, a rectangle or the like. A visualization of the linked elements is determined and forwarded to the communications-enabled personal computer 300 and displayed to the user. The documents in the information repository are files, records, objects and/or any known or later developed type of information.

In one of the exemplary embodiments, a user selects an interesting element from the elements in the first display context. However, it should be apparent that interesting elements can also be selectable using a search, direct input and/or any known or later developed selection method. The element is selected using an explicit user interface selection action such as a mouse or pen click, a gesture, surrounding the element with a bounding indicator such as a lasso, a box, a rectangle, selected using a voice command or the like. In various other exemplary embodiments the element is implicitly selected. Elements may be implicitly selected when the user's cursor or eye gaze dwells on an element for more than a threshold time period. However, it should be apparent that any explicit or implicit method useable in selecting an interesting element can also be used in the practice of this invention.

The additional elements linked to the selected element are retrieved. In some embodiments, the retrieved elements are of a different type than the elements in the first set. For example, a selected element may be a document while the retrieved elements are citations associated with the selected document. A first display characteristic is associated with the first set of elements displayed on the communications-enabled personal computer 300. Additional linked elements not already displayed are inserted into the display context of the first set of elements using a second display characteristic.

In various exemplary embodiments, the additional elements are optionally inserted into the sorted display context while maintaining spatial cues. That is, changes to the presentation are ordered to reduce the distortions to the spatial cues. Thus, in one exemplary embodiment, additional elements are added after the currently displayed elements in the subsections of the sorted display context. The elements added at the end of a section or category of display elements have less effect on spatial memory since any ordering of the previously displayed elements is not disturbed. When the current display elements overflow the available display space, spatial distortion rules are used to adjust the display layout to facilitate adding the element. It will be apparent that the exemplary spatial distortion rules are associated with left-right, top-bottom English language text. The spatial distortion rules for top-bottom, right-left oriented texts such as Chinese, add elements from the direction opposite to the reading direction. Similarly, right-left, top-bottom oriented languages such as Arabic are associated with spatial distortion rules that add text on the left hand side.

In one exemplary embodiment, the spatial distortion rules are used to specify that overflowing text elements at the right lower edge of a screen should be vertically displaced. Each element is added to the right end of the last row of icons in each section, or to the left end of a new line at the bottom of the section if the last line is full. This places the element close to the spatial location associated with that element's category. If the available display space is still too small to fit the display element, the visualization is optionally adjusted to preferentially reduce the distance between the display element categories, adjust the font size and/or perform various other transformations that preferentially preserve spatial ordering and/or spatial location cues for the user. Reducing spatial location disruptions as new elements are added allows the re-use of spatial cues within the sorted display context. The spatial cues facilitate the user's identification and/or integration of changes and patterns in the visualization. In still other exemplary embodiments, the system for displaying linked information in a sorted context 100 may be embedded within a standalone device such as a workstation or computer, embedded within an information repository such as web-server and/or placed at any other location accessible over communications links 99.

Figure 2:
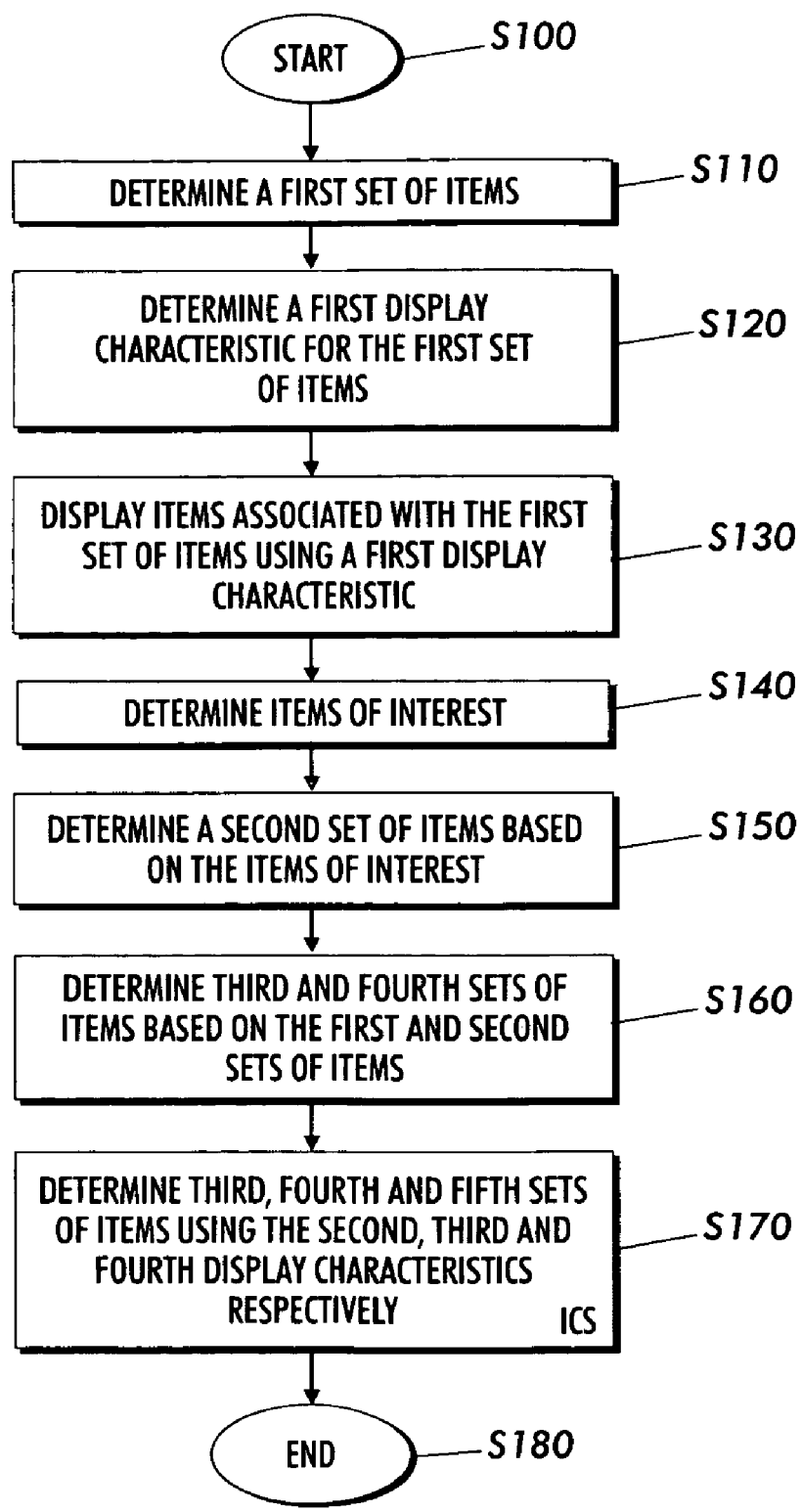
FIG. 2 is a flowchart of an exemplary method of displaying linked information in a sorted context according to this invention.

FIG. 2 is a flowchart of an exemplary method of displaying linked information in a sorted context according to this invention. The process begins at step S100 and immediately continues to step S110.

In step S110, a first set of elements is determined. The elements may be the result of a query or search, a set of elements linked to a common element, or elements chosen individually by the user. For example, in one exemplary embodiment, a first set of elements is determined based on search result records retrieved from a database query. After the first set of elements has been determined, control continues to step S120.

A first display characteristic associated with the first set of elements is determined in step S120. The display characteristic includes, but is not limited to, a font or font size, a characteristic of a font such as italics, highlighting, color saturation, hue, background or fill color of the element, stroke color, shape of the element, distinctive decorations such as stars, emblems and pictograms and/or any known or later determined human sensible display characteristic. After the first display characteristic has been determined, control continues to step S130.

In step S130, the first set of elements is displayed within a sorted display context using the first display characteristic. In one exemplary embodiment, the first display characteristic is associated with a color or hue to indicate that the associated element is in the user's current document collection. After the first set of elements have been displayed, control continues to step S140.

An interesting element is selected in step S140. The interesting element may be selected explicitly using a pointing device such as a mouse, a pen or other pointing device, selection actions such as gestures can also be used to select interesting elements. Elements are implicitly selected with an explicit user interface selection action such as a mouse or pen click, a gesture, surrounding the element with a bounding indicator such as a lasso, a box, a rectangle, selected using a voice command or the like. However, it should be apparent that any known or later developed selection method useful in indicating an interesting element can also be used in the practice of this invention. In still other embodiments, multiple interesting elements are selected. After the one or more interesting elements have been selected, control continues to step S150.

In step S150, a second set of elements is determined based on a computed relationship to the selected elements. The second set of elements is related to the interesting element based on a similarity measure and a threshold, a link connection or the like. The similarity measure includes, but is not limited to, a citation link, the similarity between documents represented by the elements, metadata attributes, textual, topic, genre, HTML tags; URL links; a database query; and/or any known or later developed similarity measure useful in determining related elements. The elements having similarity scores exceeding the threshold are associated with the second set of elements. After the second set of elements has been determined, control continues to step S160.

The third and fourth sets of elements linked to the interesting element are determined in step S160. In various exemplary embodiments, third set elements are formed by subtracting the first set of elements from the second set. The resultant third set of elements reflects conditional or proposed changes to be added to the current collection.

For example, in one embodiment, the third set of elements shows the effect of adding the second set of elements to the current document collection. The elements in the third set are associated with a second or ghosted display characteristic. The organization of the sorted display context is preferentially preserved when the new elements are added. The elements in the sorted display context are optionally categorized into categories or sections based on meta-data or other features. The third set elements are added within the relevant categories or sections of the current document collection. Thus, the spatial distribution of the current document collection is maintained, as far as possible within the allocated display space, by adding each ghosted, proposed or third set element to an appropriate category or section and placing it after elements already in that category or section. Thus, for English language and/or other left-right, top to bottom oriented text type elements, new third set text elements are added top to bottom, left to right to the end of each section.

For Arabic and other right-left, top to bottom oriented languages, the new third set text elements are optionally added from the left. It will be apparent however that elements may be added from the left, the top, the bottom and/or any other direction depending on the preferred reading direction of the language, the user and/or for the application. Moreover, when the current document collection overflows the available display space, the elements in the collection are adjusted to preferentially retain spatial cues. In various other exemplary embodiments according to this invention, new display elements are inserted within the first set elements in the current document collection. That is the new elements are inserted with the reading order of the sections. This provides an indication of the proposed changes.

A fourth set of elements is determined based on the intersection of the first and second sets of elements. This new fourth set of elements is associated with elements linked to the interesting element but which are already found in the current collection. The fourth set elements are associated with a third display characteristic. In one exemplary embodiment, the fourth set elements are associated with a highlighted display characteristic reminding the user that the elements are already in the first set of elements. A fifth set of elements is formed by subtracting the second set of elements from the first set of elements. The fifth set of elements reflects elements from the first set that are not associated with the interesting element. After the third and fourth sets of elements have been determined, control continues to step S170.

In step S170, the third, fourth and fifth sets of elements are displayed using the second, third and fourth display characteristics respectively. Thus, the elements in the third set are associated with a ghosted or second display characteristic. The ghosted or second display characteristic is typically associated with lower intrusiveness. For example, one exemplary ghosted display characteristic is associated with reduced color intensity, reduced hue, saturation levels, less intrusive colors and the like. The second set elements are divided into a third and a fourth set. The third set elements reflect new elements and are therefore associated with a second or ghosted display characteristic. The fourth set elements are associated with a third or highlighted display characteristic. The fifth set is associated with a fourth or dimmed display characteristic indicating elements from the first set that are not associated with the selected interesting element. After the elements in the third, fourth and fifth sets have been displayed with their associated display characteristics, control continues to step S180 and the process ends.

It will be apparent that in various other exemplary embodiments according to this invention, elements in the third set of items are interactively selectable. That is, a user may select one or more proposed or third set elements using a mouse button click, a gesture and/or any other selection method. The selected elements are added to the current document collection by removing the elements from the third set and assigning the elements to the first set and the relevant second, fourth and fifth sets are re-calculated and the relevant display characteristics for the elements determined and applied.

Figure 3:
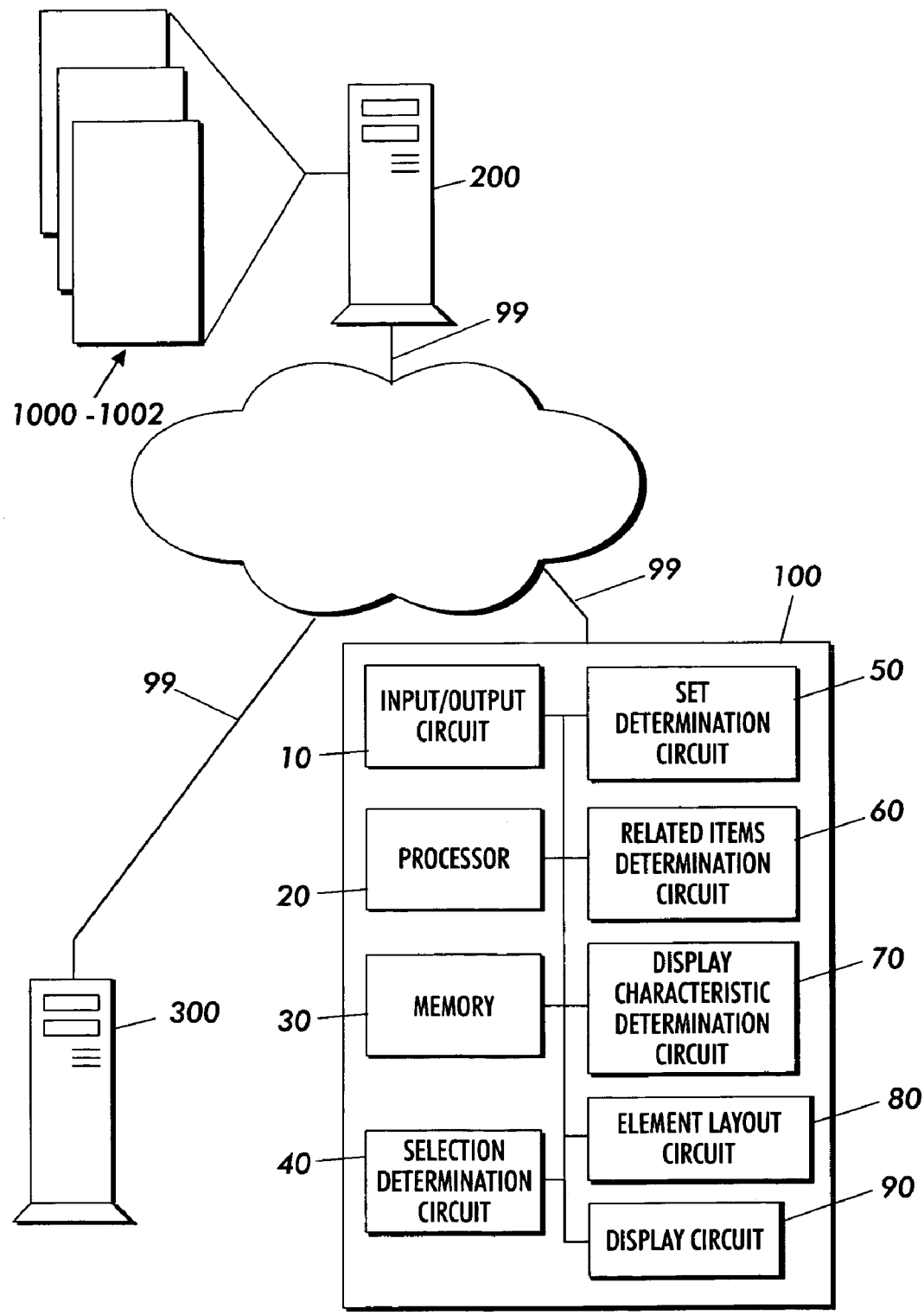
FIG. 3 is an exemplary system for displaying linked information in a sorted context according to this invention.

FIG. 3 is an exemplary system for displaying linked information in a sorted context 100 according to this invention. The system for display linked information in a sorted context 100 is comprised of a processor 20; a memory 30; a selection determination circuit 40; a set determination circuit 50; a related elements determination circuit 60; a display characteristic determination circuit 70; an element layout circuit 80 and a display circuit 90; connected through the input/output circuit 10 and through a communications link 99 to a communications-enabled personal computer 300 and an information repository 200 serving documents 1000-1002. The user of the communications-enabled personal computer 300 initiates a request to view documents in the current document collection. The request is forwarded over the communications links 99 to the system for displaying linked information in a sorted context 100. In one exemplary embodiment, the system for displaying linked information in a sorted context 100 mediates the request for the user. However, in various other embodiments, the system for displaying linked information in a sorted context 100 is embedded within the information repository 200, embedded within the communications-enabled personal computer 300 or placed at any other location accessible over communications links 99.

The system for displaying linked information in a sorted context 100 retrieves the documents from the information repository 200. For example, the documents or other information in each user's collection are optionally maintained by an information management system and associated with a user identifier or the like. The user's document collection is selected and returned to the system for displaying linked information in a sorted context 100 as a first set of documents. A first sorted display context is determined based on the first set of documents. The first sorted display context represents documents in the collection as nodes. Each node is associated with meta-data from the associated document. It should be apparent that various representations of the information may be used without departing from this invention. The nodes representing documents are selectable by the user. In one exemplary embodiment, the processor 20 of the system for displaying linked information in a sorted context 100 activates the selection determination circuit 40 to determine nodes selected by the user. A right mouse button click operation, a menu selection or the like by the user is used to select an interesting node from the first sorted display context.

The processor 20 activates the related elements determination circuit 60 to determine elements related to the interesting element. The elements related to the interesting elements form a second set of elements. The second set of elements may consist solely of the interesting or selected element. For example, this may occur when the user removes an element.

The processor 20 activates the display characteristic determination circuit 70 to determine a first or normal display characteristic for the first set elements. In an exemplary document review environment, a ghosted icon mode is entered when the user selects an element of interest with the right mouse button. In the ghosted icons mode, elements in the first set not associated with the interesting element are associated with a dimmed display characteristic that reduces the user's focus on these elements. When the user terminates the ghosted icon mode, the first set elements are displayed with a first or normal display characteristic.

The processor 20 activates the set determination circuit 50 to determine elements in a third set based on the first and second sets. The third set is determined by subtracting the first set from the second set. The resultant third set of elements reflects proposed additions to the current collection. The display characteristic circuit 90 is activated to determine a second or ghosted display characteristic for the third set of elements.

The processor 20 activates the set determination circuit 50 to determine a fourth set of elements based on the intersection of the first and second sets. The fourth set of elements reflects the elements from the second set that are already in the collection.

The processor 20 activates the set determination circuit 50 to determines a fifth set of elements by subtracting the second set of elements from the first set of elements. The fifth set of elements represent documents not associated with the interesting element.

The display characteristic circuit 60 is activated to determine a display characteristic for the fourth set of elements. In an exemplary document review environment, the fourth set of elements is associated with a third or highlighted display characteristic indicating that the documents represented by fourth set are already in the collection. However, it will be apparent that the various display characteristics are optionally adjustable, by the user, under programmatic control and the like.

The processor 20 then activates the element layout circuit 80 to preferentially add elements from the third set of elements to the sorted display context based on spatial distortion rules previously stored in memory 30. The elements are added within any existing sorted categories. If a new element falls within a category not already in existence, the new category is created.

The spatial distortion rules allow the third set of elements to be added to the sorted display context while minimizing distortions. That is, the spatial distortion rules specify how additional elements are added to the sorted display context to maintain spatial cues. The spatial distortion rules are based on the type of information to be added, user preferences, system preferences and the like.

The processor 20 then activates the display circuit 90 and forwards the sorted display context over communications links 99 to the user of the communications-enabled personal computer 300.

It will be apparent that in various other exemplary embodiments according to this invention, elements in the third set of items are interactively selectable. That is, a user may select one or more proposed or third set elements using a mouse button click, a gesture and/or any other selection method. The selected elements are added to the added to the current document collection by removing the elements from the third set and assigning the elements to the first set and the relevant second, fourth and fifth sets are re-calculated and the relevant display characteristics for the elements determined and applied.

Figure 4:
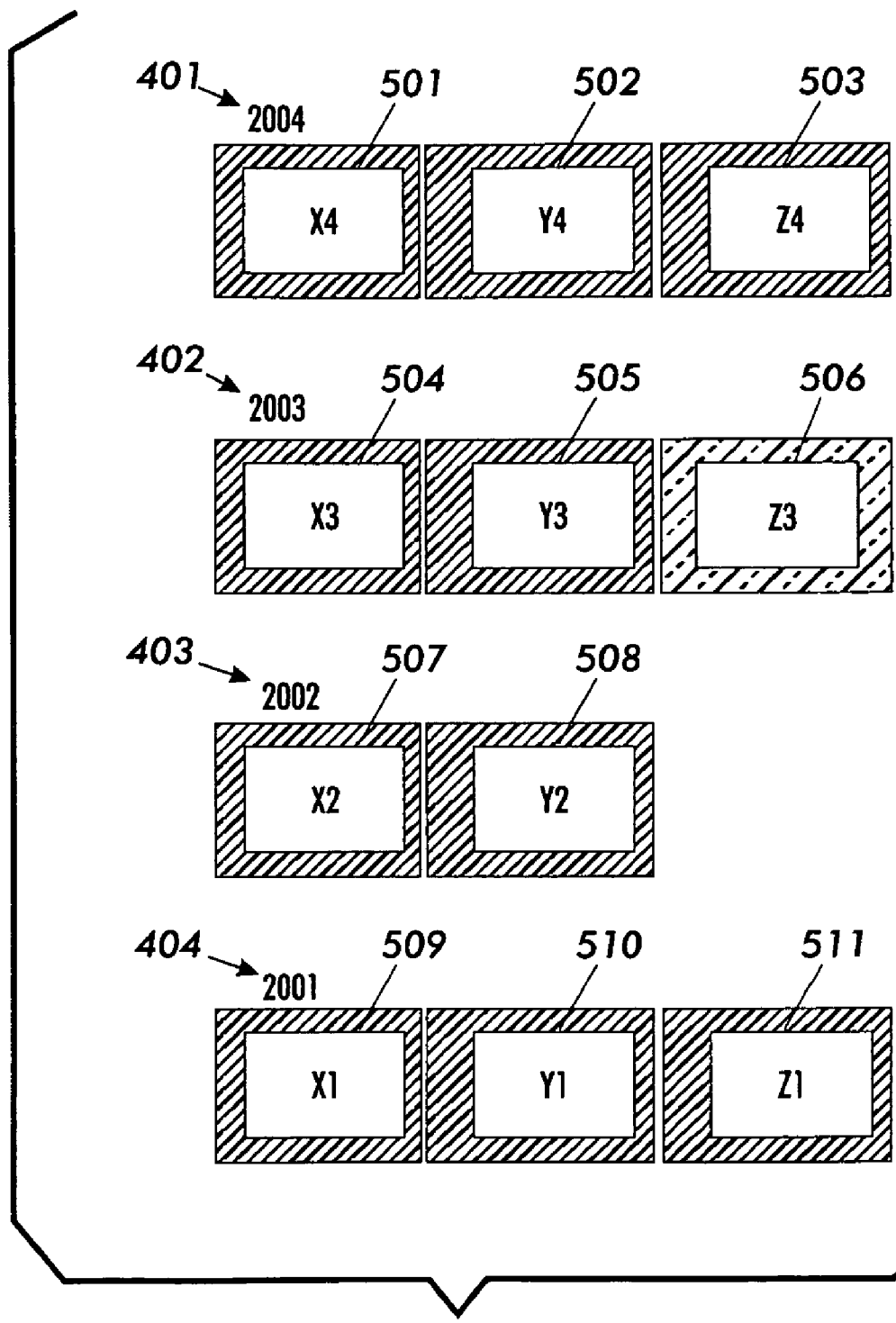
FIG. 4 shows a first exemplary sorted display context according to this invention.

FIG. 4 shows a first exemplary sorted display context according to this invention. In one exemplary embodiment according to this invention, the set of elements 501-511 represent documents found by a search of an information repository. However, it will be apparent that various methods of selecting a set of elements may be used in the practice of this invention. Moreover, the documents represented by the elements may be obtained programmatically, by manual user selection and the like. In one exemplary embodiment, elements in the first set 501-511 are categorized vertically by year of publication 401-404 and horizontally by the title of each element. Each element in the first set is associated with a first display characteristic. Element X4 501 is displayed as the first element in the first row followed by element Y4 502 and element Z4 503. The elements are each displayed beneath the 2004 year category 400. The title-based horizontal ordering and date-based vertical ordering provide a sorted context that facilitates finding relevant elements.

Similarly, element X3 504, element Y3 505 and element Z3 506 are all displayed in the second row beneath the 2003 year category 400. The element Z3 506 is selected as an interesting element to the user. An interesting element is optionally associated with a display characteristic different than the first display characteristic. In one exemplary embodiment, a new or third set of elements is determined based on the interesting element. Thus, the third set is associated with proposed additions or changes to the current collection of elements. Thus, the third set is associated with a second display characteristic indicating the proposed or conditional nature of the elements. In other exemplary embodiments, the third set of elements reflects elements linked to the selected element or elements. The elements associated with the second or ghosted display characteristic signal what elements are linked to the selected element. For example, the elements associated with the second or ghosted display characteristic can be used to visualize the research papers on which a selected research paper is based.

The third row of the sorted display context contains the element X2 507 and element Y2 508. The documents are categorized under the 2002 year category 403. Finally the fourth row of the sorted display context contains the elements X1 509, Y1 510 and Z1 511 under the year category 404. It will be apparent that various other element attributes or features may also be used to categorize the elements.

Figure 5:
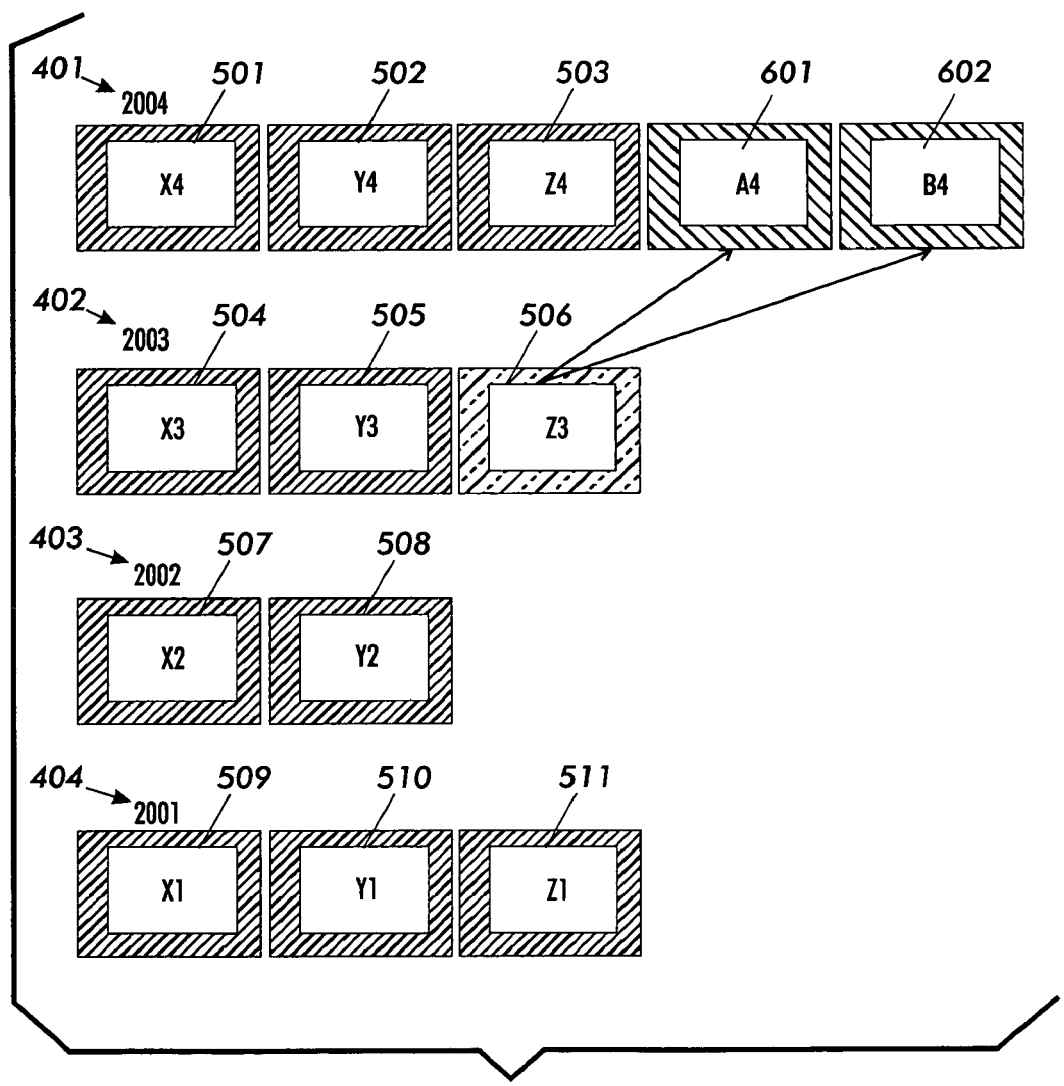
FIG. 5 is an animation showing the addition of new second set elements to the current sorted display context according to this invention.

FIG. 5 is an animation showing the addition of new second set elements to the current sorted display context according to this invention. The new or second set elements originate from a previously selected interesting element Z3 506. The second set element A4 601 is animated across a path from the interesting element Z3 506 to the 2004 year category 401. In one exemplary embodiment, the second set elements A4 601 and B4 602 are inserted into the sorted display context following the first set elements X4 501, Y4 502 and Z4 503 that are already in the sorted display context. The new element is associated with a less intrusive display characteristic indicative of its conditional, tentative or less salient status.

Figure 6:
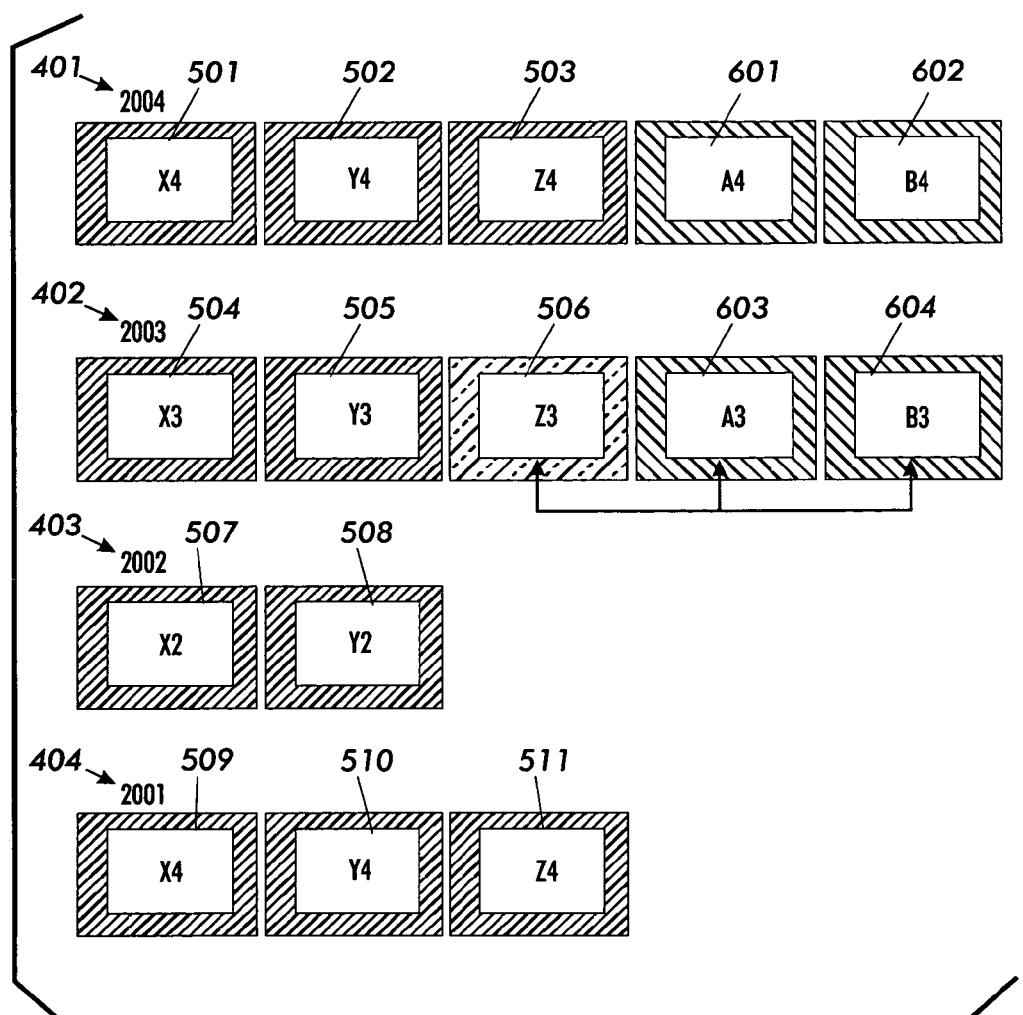
FIG. 6 is a second animation showing the addition of new second set elements to the current sorted display context according to this invention.

FIG. 6 is a second animation showing the addition of new second set elements to the current sorted display context according to this invention. Additional elements A3 603 and B3 604 are shown originating from the interesting element 506 and following a path to the second row under the 2003 year category 402. The placement of new second set elements after the old first set elements already in the sorted display context avoids disturbing spatial cues. However, the newly added second set elements are added within the appropriate vertical year category 402. The newly added second set elements can be appended to the currently displayed elements to maintain spatial cues or can be sorted into the currently displayed elements to provide additional context.

Figure 7:
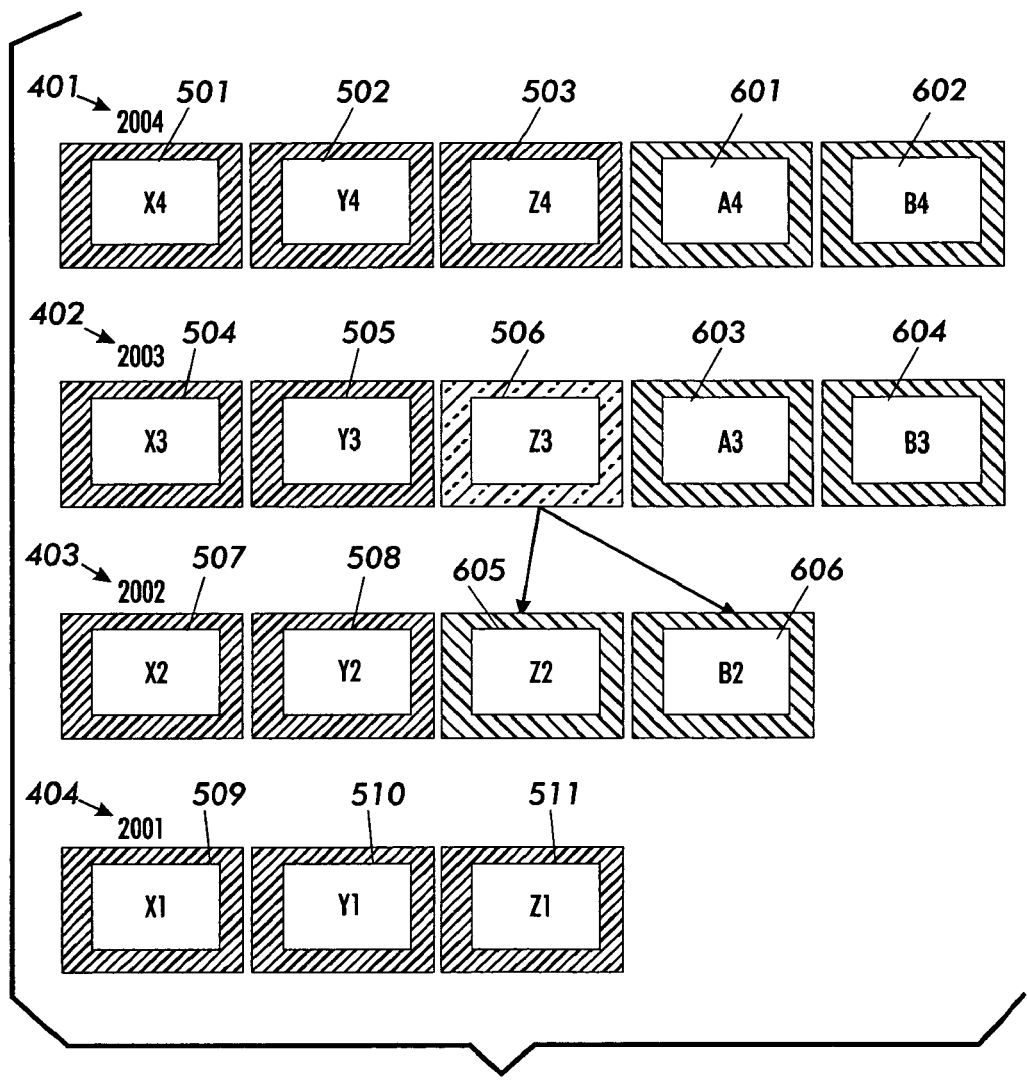
FIG. 7 is a third animation showing the addition of new second set elements to the current sorted display context according to this invention.

FIG. 7 is a third animation showing the addition of new second set elements to the current sorted display context according to this invention. Additional second set elements A2 605 and B2 606 are shown originating from the interesting element Z3 506. The additional second set elements traverse paths from the interesting elements 506 to the third row under the 2004 year category 403. The additional second set elements A2 605 and B2 606 are added after the first set of elements X2 507, Y2 508. This preserves the spatial cues. The second set elements A2 605 and B2 606 are associated with a second or ghosted display characteristic indicating a tentative or conditional status.

Figure 8:
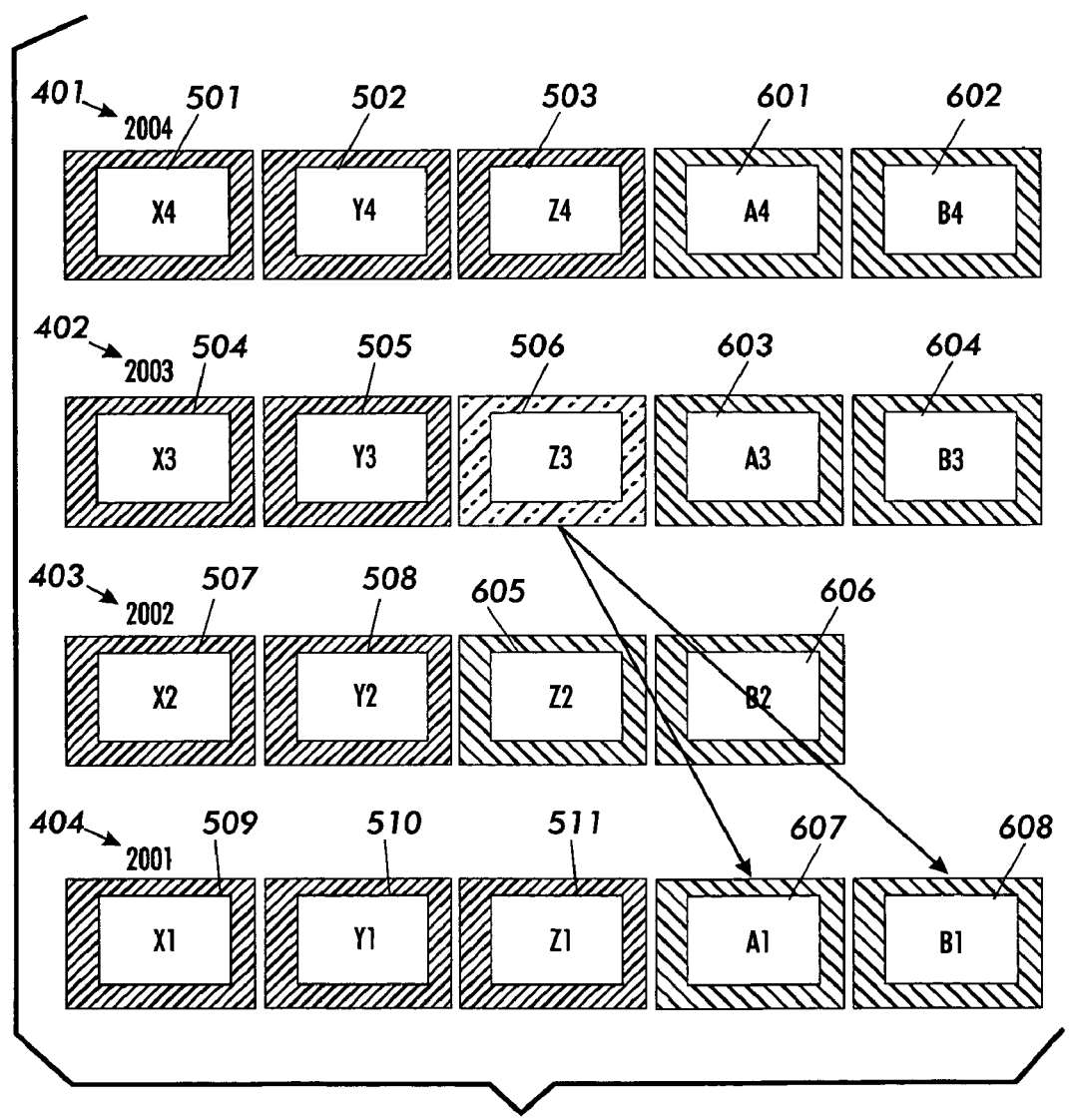
FIG. 8 is a fourth animation showing the addition of new elements to the current sorted display context according to this invention.

FIG. 8 is a fourth animation showing the addition of new elements to the current sorted display context according to this invention. Additional elements A1 607 and B1 608 originate from the interesting element Z3 506. The additional elements traverse a path to the fourth row under the 2001 year category 404.

Figure 9:
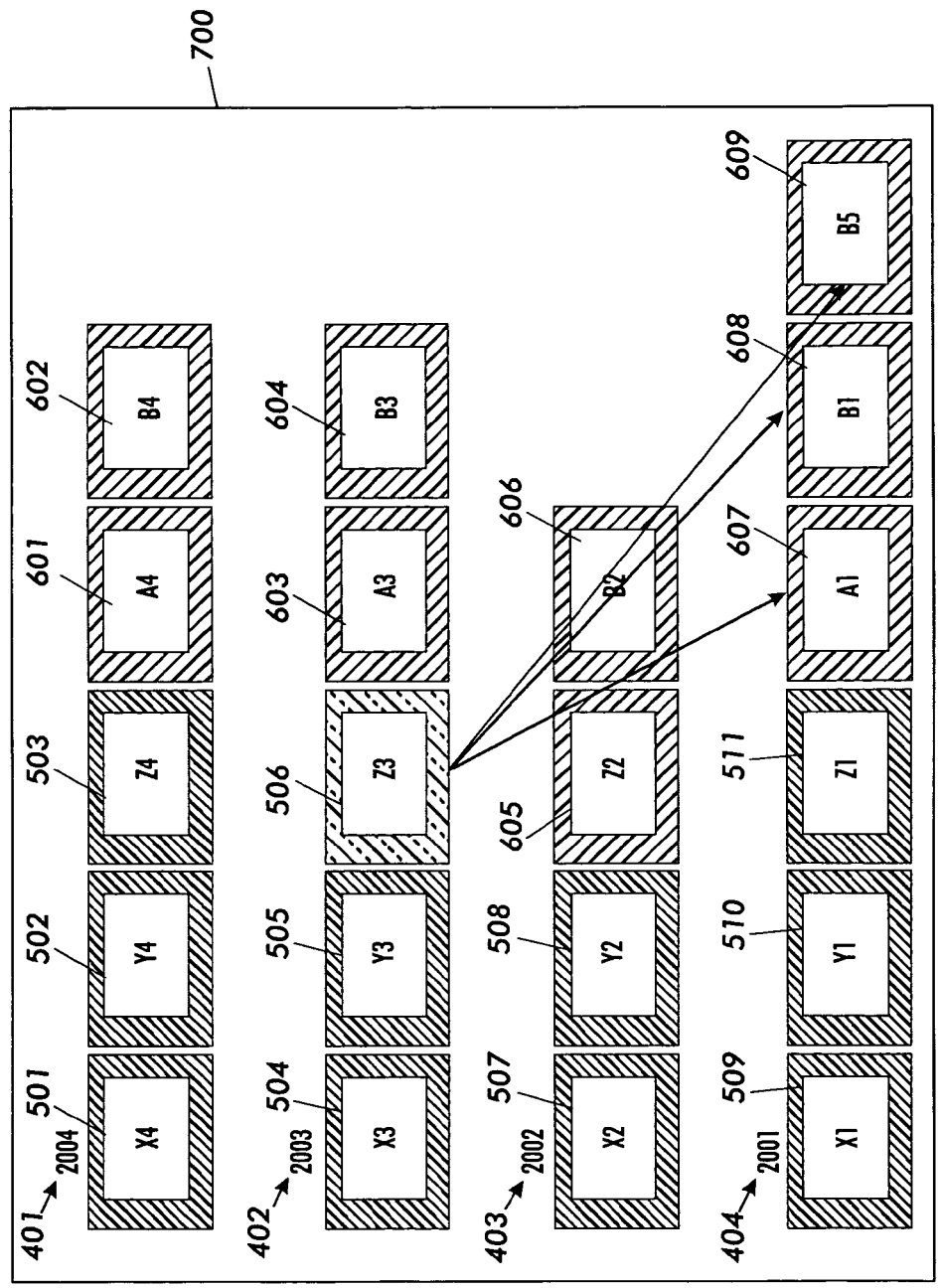
FIG. 9 shows an element overflowing a bounded display area.

FIG. 9 shows an element overflowing a bounded display area 700. The additional second set element B5 609 does not fit within the bounded display area 700. The sorted display context is determined and a transformation applied to add the additional second set element based on a spatial distortion rule. The spatial distortion rules preferentially inform the display system how to adjust the layout of the current sorted display context. The spatial distortion rules indicate how to add elements to the sorted display context without unduly affecting the spatial cues. The spatial distortion rules are retrieved from a memory or file, entered by the user, retrieved based on a user identifier or the like.

In one exemplary embodiment, the spatial distortion rules indicate how an overflowing new or second set display element is added to the sorted display context. Thus, if the element overflows a row in its associated section, but space exists in the bounded display area for additional rows, the new element may be displaced horizontally and vertically to begin a new row below the existing row. If additionally, there is not enough space on the screen for any additional rows, the new row may be placed at coordinates off-screen, or one or more existing rows may be moved to coordinates off-screen in order to make room for the new row. The spatial distortion rules may also specify that the entire layout of icons, or some portion of the entire layout, should be reduced in size by an affine or other transformation, so that a greater number of the original and newly added elements will be visible within the bounded display area after the addition of new elements is completed. It should be apparent that the information content of the display elements, the language of information contained in the element, preferences of the user and the like, are also used to select a layout adjustment.

Figure 10:
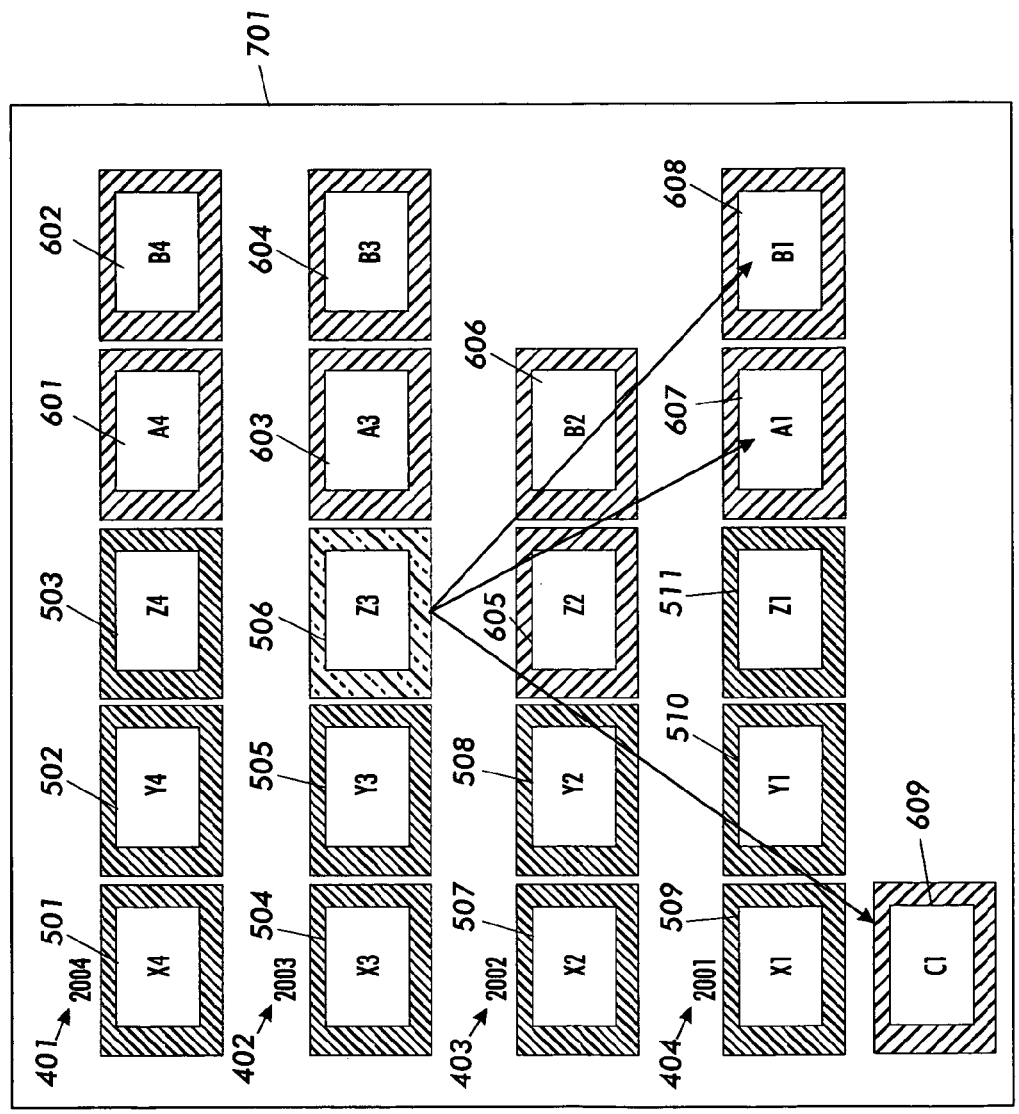
FIG. 10 is an exemplary display showing a first vertically displaced new second set element according to this invention.

FIG. 10 is an exemplary display showing a first vertically displaced new second set element according to this invention. The new second set element C1 609 would be added to the end of the first line of the 2001 year category 404, but for the lack of display space. The spatial distortion rules specify vertical and horizontal layout adjustments that wrap the new element to the left edge of the next line. This allows the new overflowing second set element C1 609 to be displayed within the bounded display space. The resultant display maintains the spatial memory cues of the previous sorted display context while integrating the additional new second set element.

Figure 11:
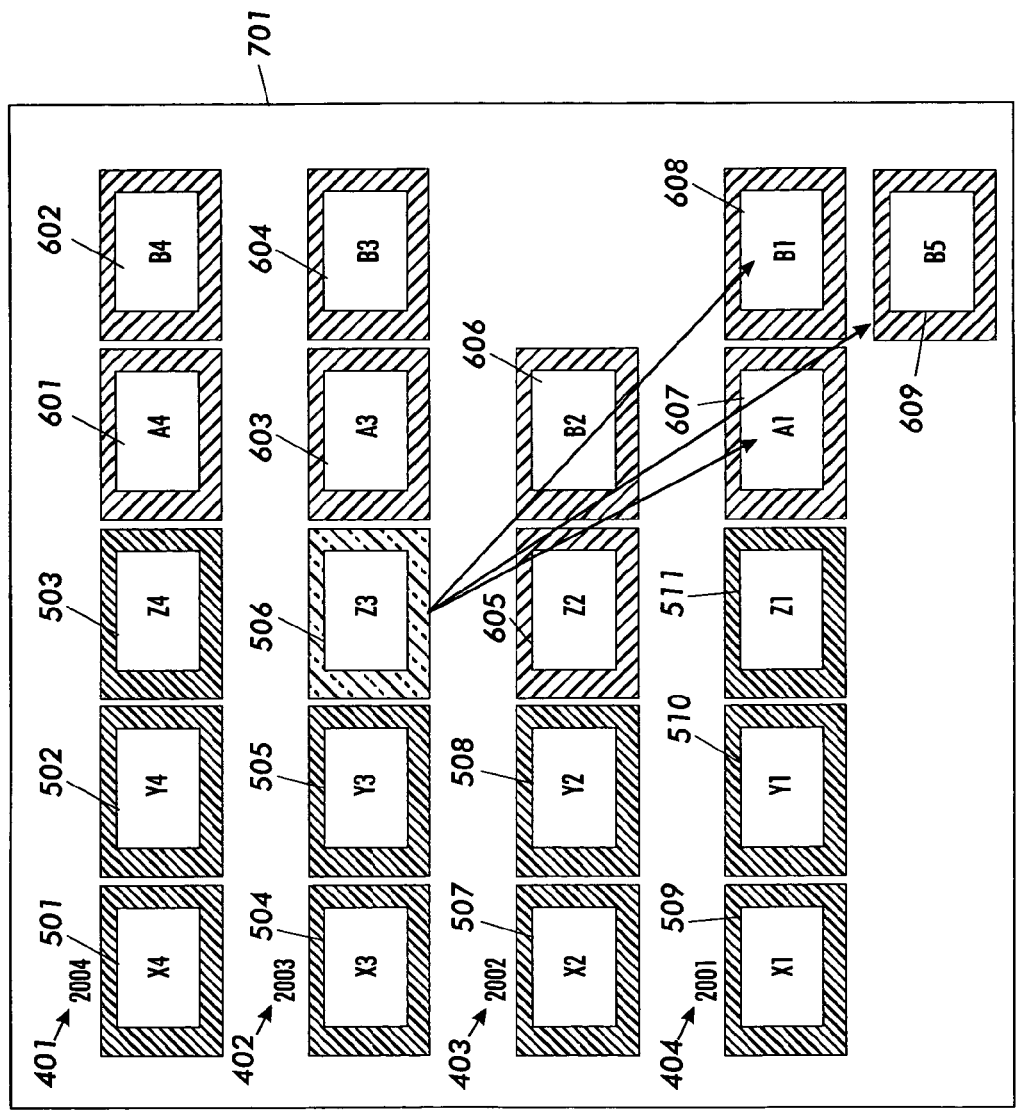
FIG. 11 is an exemplary display showing a second vertically displaced new second set element according to this invention.

FIG. 11 is an exemplary display showing a second vertically displaced new second set element according to this invention. The new second set element C1 609 would be added to the end of the first line of the year 2001 category 404 but for the lack of display space. The spatial distortion rules specify vertical displacement layout adjustments should be made to fit the new overflowing second set element C1 609 within the bounded display space. The resultant display maintains the spatial memory cues of the previous sorted display context while integrating the additional new second set element. In still other exemplary embodiments, elements overflow onto additional display rectangles, regions, or pages. The user is then able to use panning and zooming controls to view the overflow elements. Moreover, it should be apparent that the animations optionally associated with adding elements may occur sequentially and/or simultaneously.

Figure 12:
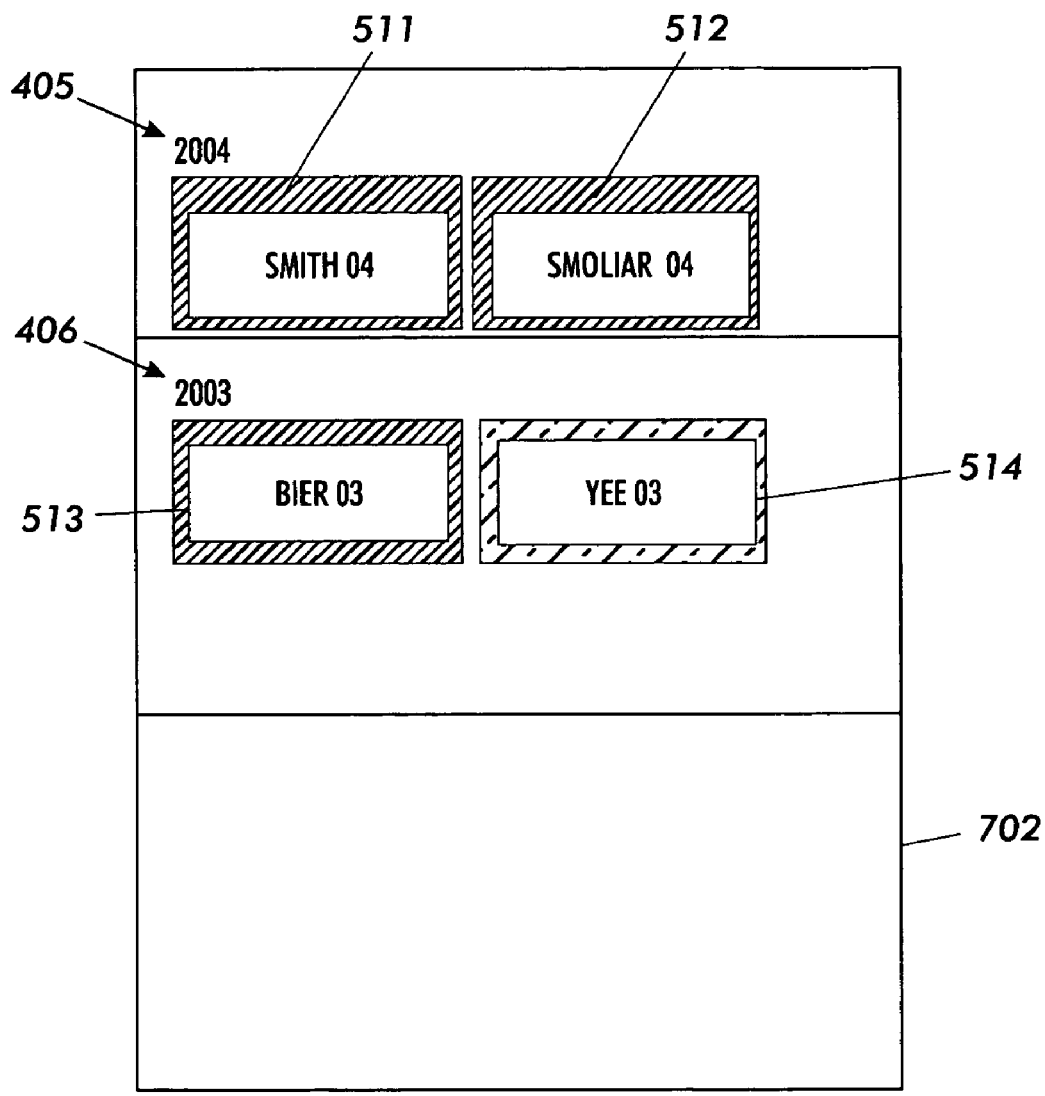
FIG. 12 is a first sorted display context of a document collection according to this invention.

FIG. 12 is a first sorted display context of a document collection according to this invention. The elements representing documents Smith 04 511 and Smoliar 04 512 are displayed sorted within a year 2004 category 405. The sorting or ordering of the elements is optionally based on a system specification, a user preference, other kinds of meta-data within the associated document or the like. The spatial sorting or categorizing of the elements allows the user to identify patterns in the information. The elements Bier 03 513 and Yee 03 514 are displayed sorted within a year 2003 category 406. The elements in Smith 04 511, Smoliar 04 512, Bier 03 513 and Yee 03 514 form a first set of elements. The ordering of the elements within the year categories 405-406 form a sorted context within which the information can be more easily integrated. In one exemplary embodiment, a sorted ghost icon mode is selected by using the right mouse button to select the interesting element Yee 03 514. The display characteristics for fifth set elements, or first set elements that are not associated with the interesting element Yee 03 514, are changed to a fourth or dimmed display characteristic. The interesting element Yee 03 514 is optionally associated with a fifth or selected display characteristic.

Figure 13:
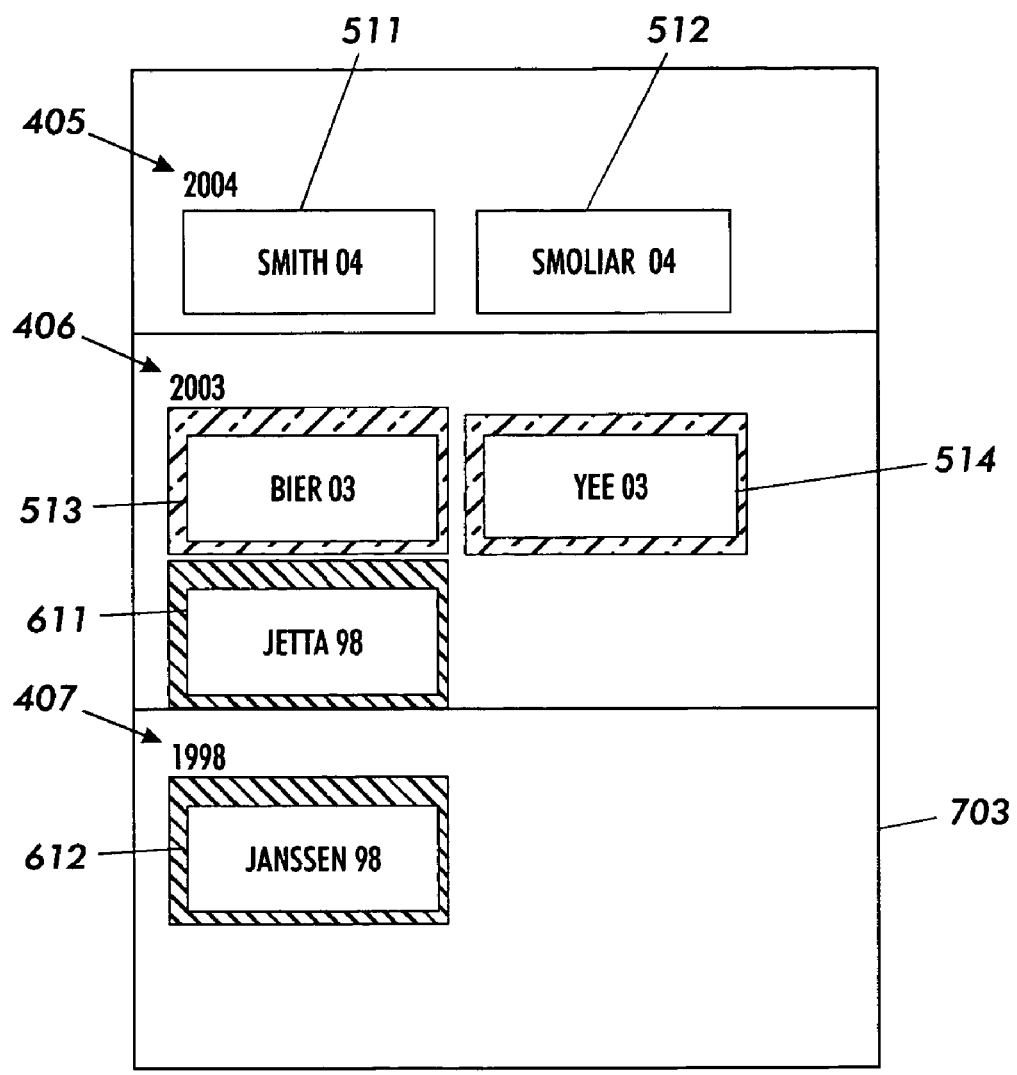
FIG. 13 is a second sorted display context of a document collection according to this invention.

FIG. 13 is a second sorted display context of a document collection according to this invention. The user selects interesting element Yee 03 514 by clicking on the element and a sorted ghost icon mode is entered. A second set of elements representing documents selected from a document repository are determined. In this case the second set of elements is determined by identifying documents cited by the document represented by interesting element Yee 03 514. The second set of elements contains element representing the elements Bier 03 513, Jetta 03 611 and Jansen 98 612.

A third set of elements is determined based on various transformations of the first and second sets. In one exemplary embodiment, a third set of elements is determined by subtracting the first set elements from the second set elements. The resultant third set elements reflect elements that are not currently in the display but which are proposed for review. The new third set elements are associated with a second or ghosted display characteristic and are inserted within the sorted display context based on spatial distortion rules. The spatial distortion rules preferentially preserve spatial cues in the display. For example, an exemplary spatial distortion rule specifies the insertion of third set elements at the end of the relevant categories in the display space. Thus, new second set elements are added to relevant sorted categories in the sorted display context. However, in some exemplary embodiments, the categories or sections are sub divided into original and conditional portions. The original portion of a category or section presents the original sorting of the first set icons. The conditional portion of a category presents the third set elements for the relevant category. The positioning of the third set elements is determined in association with one or more spatial distortion rules, selected by the user and/or determined programmatically. This preservation of the ordering of the first set elements in the category, while also presenting third set elements allows the re-use of spatial cues. By contrast, sorting of the third set elements into original portions allows direct comparison of proposed changes to the display.

A fourth set of elements is determined by finding the intersection of the first and second sets of elements. That is, common elements from the first and second sets of elements are associated with a fourth set of elements. The display characteristic for the fourth set of elements indicates an association with the interesting element.

FIG. 14 is an exemplary data structure for storing display characteristics 800 according to this invention. The data structure for storing display characteristics 800 is comprised of a set portion 810; an elements portion 820; a normal mode display characteristic portion 830; and a ghosted mode display characteristic portion 840.

The first row of the data structure for storing display characteristics 800 contains the entries "S1", "SMITH 04, SMOLIAR 04, BIER 03, YEE 03", "NORMAL" and "N/A". These entries indicate that set S1 contains the associated elements SMITH 04, SMOLIAR 04, BIER 03 and YEE 03. In the non-ghosted icon mode, S1 elements are associated with a normal display characteristic. The ghosted mode display characteristic contains the entry "N/A" since the ghosted mode display characteristic is associated with a subset of the elements in S1∪S2.

The second row contains the entries "S2", "YEE 03, JETTA 03, JANSSEN 98" "N/A" and "N/A". These entries indicate that an exemplary second set S2 is comprised of the elements YEE 03, JETTA 03 and JANSSEN 98. The normal and ghosted icon mode display characteristics for the set are associated with the value "N/A" indicating that the second set is not displayed directly either in the normal mode or the ghosted icon mode. Instead, portions of the unions of S1 and S2, S1∪S2 are displayed.

The third row contains the values "S3=S2−S1", "JETTA 03, JANSSEN 98" "N/A" and "GHOSTED". These entries indicate that exemplary third set S3 is formed by subtracting set S1 from set S2. Set S3 is not displayed in the non-ghosted icon mode and is therefore associated with a "N/A" or not-applicable value for the normal mode display characteristic. An exemplary dimmed display characteristic is associated with the ghosted icon mode.

The fourth row contains the value "S4=S1∩S2", "BIER 03, YEE 03", "NORMAL", "HIGHLIGHTED". These entries indicate that elements in the exemplary fourth set S4 are formed from the intersection of set S1 and S2. The set S4 contains the elements BIER 03 and YEE 03. These elements are associated with a normal display characteristic in non-ghosted icon mode and a highlighted display characteristic in the ghosted icon mode. In one exemplary embodiment, the elements of set S4 reflect elements related to a user selected interesting element.

The fifth row contains the entries "S5=S1−S2", "SMITH 04, SMOLIAR 04", "NORMAL" and "DIMMED". These entries indicate that the exemplary fifth set is associated with a normal display characteristic in non-ghosted icon mode and a dimmed display characteristic in ghosted icon mode. The fifth set elements are already in the display but are not related to the one or more interesting elements.

The sixth row contains the entries "S6=SELECTED ELEMENTS", "YEE 03", "NORMAL", "SELECTED". These entries indicate that exemplary set S6 is determined by selecting an element of interest. Other values for selecting set S6 elements include, but are not limited to a search query, programmatically and the like. The set S6 is associated with a normal display characteristic in the non-ghosted icon mode and a selected display characteristic in the ghosted icon mode. The element YEE 03 is indicated as a selected element.

Figure 15:
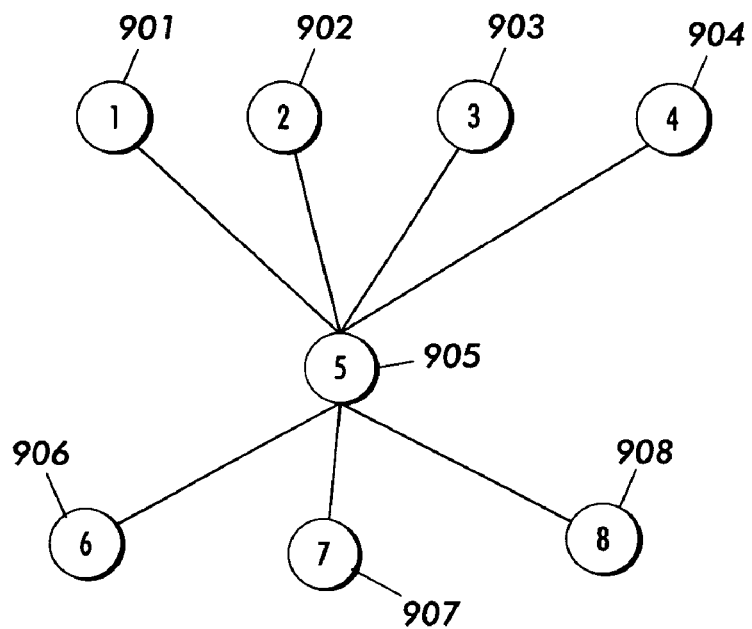
FIG. 15 is an exemplary citation graph showing linked nodes.

FIG. 15 is an exemplary citation graph showing linked nodes. The linked nodes or elements are optionally associated with documents, database records and/or any linked information item. The first 4 nodes 901-904 are each connected to node 5, 905. Nodes 6-8, 906-908 are also each connected to node 5, 905.

Figure 16:
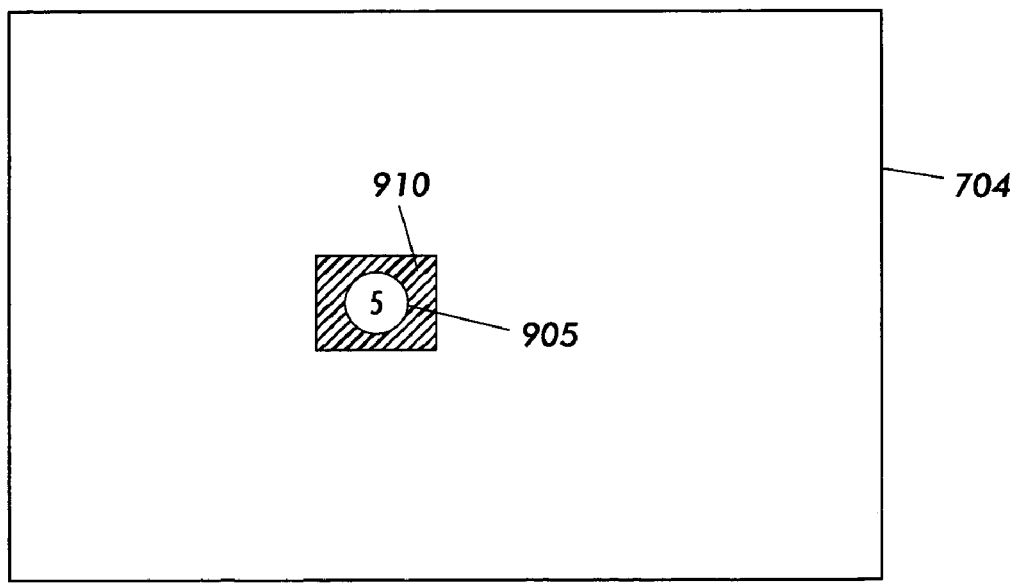
FIG. 16 shows a selected node in a citation graph of linked nodes.

FIG. 16 shows a selected node in a citation graph of linked nodes. The selected node is node 5, 905. The node 5, 905 is selected based on the explicit and/or implicit actions of a user. For example, the node may be selected based on keyboard entries, mouse, pen or gesture actions, voice commands, the results of a query or various other actions.

Figure 17:
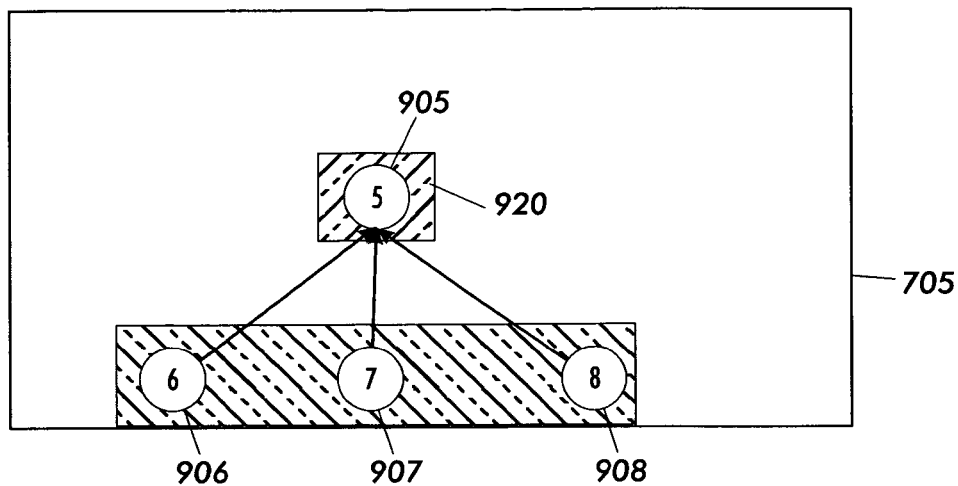
FIG. 17 is an exemplary citation graph showing links around an element according to a first aspect of this invention.

FIG. 17 is an exemplary citation graph showing links around an element according to a first aspect of this invention. The first set of nodes or elements consists of node 5, 905 and is associated with first or normal display characteristic 910. The user selects the node 5, 805 as the interesting node. The interesting node is associated with a fifth or selected characteristic. For example, in a digital library environment, a citation search function is used to select the second set of nodes. The user selects a citation search function to determine the set of nodes cited by the selected node 5, 905. Thus, a second set of nodes 6-8, 906-908 are determined. A third set of nodes is formed from the second set nodes not already displayed in the sorted display context. The third set of nodes is associated with a second or ghosted display characteristic. The second or ghosted display characteristic includes, but is not limited to, a reduced intensity, less color saturation, less intrusive font characteristics, colors, size and the like. The nodes are selected for the second set by individually clicking on one or more nodes and/or otherwise selecting nodes in the graph, selecting nodes based on a query or the like.

Figure 18:
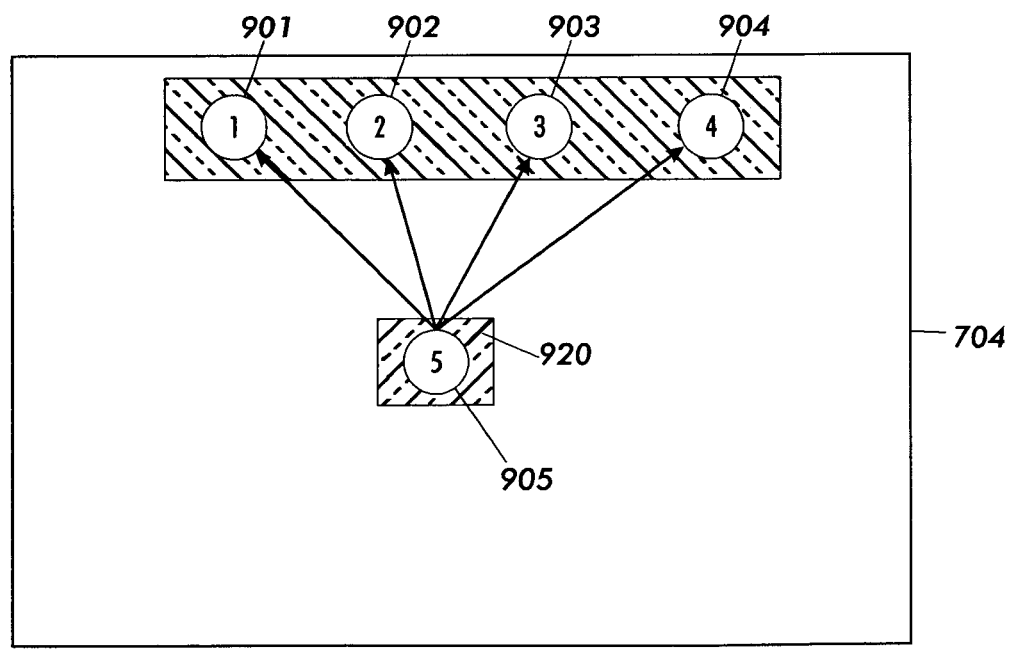
FIG. 18 is an exemplary view of a sorted display context according to a second aspect of this invention.

FIG. 18 is an exemplary view of a sorted display context according to a second aspect of this invention. The node 5, 905 is selected by the user to determine a second set of nodes. A third set of nodes is determined by subtracting the first set from the second set. The third set of nodes represents nodes not already in the display and are associated with a second or ghosted display characteristic 920. In one exemplary embodiment, a citation search function is performed to determine nodes that cite selected node 5, 905. Node 1-4, 901-904 comprise the second set of nodes. A third set of nodes is formed by subtracting the first set nodes from the second set nodes. The third set nodes reflect new nodes not yet added to the sorted display context.

In an exemplary document repository environment, a user reviews user interface elements representing a collection of documents. The user organizes the elements associated with the documents into a linked neighborhood. The selection of an interesting element creates a sorted display context of the visualized document collection. The documents already in the user's collection are represented by elements associated with the first or normal display characteristic. When the ghost icon mode is selected, documents related to the interesting documents, but not yet found in the collection are associated with a second or ghosted display characteristic and inserted into the sorted display context. The documents linked to the interesting document and which are already in the document collection are displayed using a third or highlighted display characteristic. Documents in the collection but not related to the interesting document are displayed with a fourth or dimmed display characteristic.

The links between an interesting document outside of the user's collection and the documents already in the user's collection are then easily identifiable. This helps in prioritizing the documents for later review. The links between the interesting document and documents within the user's collection are useful in justifying further review of the document. In an exemplary document repository environment, a sorted display context including ghosted elements provides the user with a means to review potential document collection changes within the sorted display context of the current collection.

In various exemplary embodiments, the system for displaying linked information in a sorted context 100 is incorporated into a user-interface. The user-interface provides an environment for reviewing information elements that within a user's current spatial layout.

In the various embodiments of the system for displaying linked information in a sorted context 100, each of the circuits 10-80 outlined above can be implemented as portions of a suitably programmed general-purpose computer. Alternatively, 10-80 of the system for displaying linked information in a sorted context 100 outlined above can be implemented as physically distinct hardware circuits within an ASIC, or using a FPGA, a PDL, a PLA or a PAL, or using discrete logic elements or discrete circuit elements. The particular form each of the circuits 10-80 of the system for displaying linked information in a sorted context 100 outlined above will take is a design choice and will be obvious and predictable to those skilled in the art.

Moreover, the system for displaying linked information in a sorted context 100 and/or each of the various circuits discussed above can each be implemented as software routines, managers or objects executing on a programmed general purpose computer, a special purpose computer, a microprocessor or the like. In this case, the system for displaying linked information in a sorted context 100 and/or each of the various circuits discussed above can each be implemented as one or more routines embedded in the communications network, as a resource residing on a server, or the like. The system for displaying linked information in a sorted context 100 and the various circuits discussed above can also be implemented by physically incorporating the system for displaying linked information in a sorted context 100 into software and/or hardware system, such as the hardware and software systems of a web server or a client device.

As shown in FIG. 3, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 3, can each be any known or later developed device or system for connecting a communication device to the system for displaying linked information in a sorted context 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented method of displaying linked information in a sorted context comprising the steps of:
   determining an initial set of display elements in a document;
   selecting a display element from the initial set of display elements;
   determining a display characteristic associated with the initial set of display elements;
   identifying an additional set of display elements in the document that are each linked to the selected display element, comprising:
      selecting at least one similarity measure comprising a computed relatioship shared by the selected display element and the additional set of display elements; and
      quantitatively comparing the at least one similarity measure to a threshold; and
      creating a combined set of display elements comprising the initial and the additional sets of display elements when the at least one similarity measure exceeds the threshold;
   preserving spatial relationships between the initial and the additional sets of display elements in the document, wherein the spatial relationships comprise each initial set of display elements sharing its row with neither more nor less than the same set of initial set of display elements as before;
   sorting the initial and the combined sets of display elements into sections based on spatial distortion rules for each section; and
   displaying the sections comprising the combined set of display elements with the initial set of display elements in a single composite sorted display.

2. The method of claim 1, wherein the combined set of display elements is a subset of the union of the initial and the additional sets of display elements.

3. The method of claim 1, wherein the combined set of display elements is the additional set of display elements minus the initial set of display elements.

4. The method of claim 1, further comprising the steps of determining a fourth set of display elements based on the intersection of the initial and the additional sets of display elements and associating a combined display characteristic with the fourth set of display elements.

5. The method of claim 1, wherein the selected display element is selected based on at least one of: an indicator; a voice indicator; a visual indicator; a mouse click; a user interest dwell time; a voice selection, a pen click, a selection gesture, a pen gesture, dragging with a lasso, a bounding area and a rubber band rectangle.

6. The method of claim 1, further comprising:
   determining an additional display characteristic associated with the set of additional display elements, wherein the additional display characteristic is at least one of: a conditional, a tentative and a less salient attribute associated with the combined set of display elements.

7. The method of claim 6, wherein the additional display characteristic is at least one of: reduced color saturation; reduced intensity; italics, reduced internal contrast, reduced contrast from the background; blurring, reduced high frequencies and increased transparency.

8. The method of claim 1, wherein the specific spatial relationships includes the horizontal position of display elements from the initial set of display elements, relative to the left edge of a background rectangle over which the initial set of display elements is displayed.

9. The method of claim 1, wherein the specific spatial relationships includes a left to right ordering of all initial set of display elements on any given row.

10. The method of claim 1, wherein the specific spatial relationships includes the horizontal displacement between any pair of initial set of display elements on a given row.

11. The method of claim 1, wherein the specific spatial relationships includes the vertical position of display elements from the initial set, relative to the top edge of a background rectangle over which the initial set of display elements is displayed.

12. The method of claim 1, wherein the specific spatial relationships includes a top to bottom ordering of all initial set of display elements on any given column.

13. The method of claim 1, wherein the specific spatial relationships includes the vertical displacement between any pair of initial set of display elements on a given column.

14. The method of claim 1, wherein the specific spatial relationships includes each initial set of display elements sharing its colunm with neither more nor less than the same set of initial set of display elements as before.

15. The method of claim 1, wherein the initial set of display elements is comprised of at least one of: icons, windows, thumbnails, tiles and rectangles.

16. The method of claim 15, wherein the additional set of display elements represent at least one of: a linked item, a document, a uniform resource locator and a citation.

17. The method of claim 1, wherein the additional set of display elements is comprised of at least one of: icons, windows, thumbnails, tiles and rectangles.

18. The method of claim 17, wherein the display elements represent at least one of: a linked item, a document, a uniform resource locator and a citation.

19. The method of claim 1, wherein the initial set of display elements is not the same as the additional set of display elements.

20. The method of claim 1, wherein the display elements of the combined set are selectable and the selected display elements are added to the initial set of display elements.

21. The method of claim 20, wherein the added display elements are associated with the initial display characteristic.

22. The method of claim 1, wherein the display elements are sorted based on meta-data.

23. The method of claim 1, wherein the transition from the initial display to the composite sorted display is presented with an animation.

24. The method of claim 23, wherein at the beginning of the animation each display element representing one of the combined set of display elements is initially positioned coincident with a selected display element.

25. The method of claim 1, wherein a display element from the additional set of display elements is selectable and changes set membership in at least one of these ways: becomes a member of the initial set of display elements and ceases to be a member of the initial set of display elements based on the selection.

26. The method of claim 1, wherein the sorted context is determined by sorting display elements into categories, assigning an order to the categories, and displaying the categories in non-overlapping rectangles on at least one of: a screen, a display buffer and a virtual canvas.

27. The method of claim 26, wherein at least one information item is associated with a plurality of categories, with one display element for each category to which the information item is assigned.

28. The method of claim 26, further comprising:
determining the categories by meta-data attributes of the information item associated with each display elements.

29. The method of claim 28, wherein the meta data attributes are at least one of: a title, an author, a publication date and a file nam.

30. The method of claim 26, wherein the sorted context additionally consists of sorting the display elements within each section according to metadata attributes of the associated information item.

31. The method of claim 30, wherein the meta-data attributes are at least one of: a title, an author, a publication date and a file name.

32. A computer-implemented system for displaying linked information in a sorted context comprising:
an information respository comprising a document; and
a processor, comprising:
a set determination circuit configured to determine an initial set of display elements in the document and to select a display element from the initial set of display elements;
a display characteristic determination circuit configured to determine a display characteristic associated with the initial set of display elements;
a related elements determination circuit configured to identify an additional set of display elements in the document that are each linked to the selected display element comprising a selection of at least one similarity measure comprising a computed relationship shared by the selected display element and the additional set of display elements, a quantitative comparison of the at least one similarity measure to a threshold and a creation of a combined set of display elements comprising the initial and the additional sets of display elements when the at least one similarity measure exceeds the threshold;
an element layout circuit configured to preserve spatial relationships between the initial and the additional sets of display elements in the document, wherein the spatial relationships comprise each initial set of display elements sharing its row with neither more nor less than the same set of initial set of display elements as before, and to sort the initial and the combined sets of display elements into sections based on spatial distortion rules for each section; and
a display circuit configured to display the sections comprising the combined set of display elements with the initial set of display elements in a single composite sorted display.

33. The system of claim 32, wherein the combined set of display elements is a subset of the union of the initial and the additional sets of display elements.

34. The system of claim 32, wherein the combined set of display elements is the additional sets of display elements minus the initial set of display elements.

35. The system of claim 32, wherein the set determination circuit is further configured to determine a fourth set of display elements based on the intersection of the initial and the additional sets of display elements and to determine a combined display characteristic with the fourth set of display elements.

36. The system of claim 32, wherein the selected display element is selected based on at least one of: an indicator; a voice indicator; a visual indicator; a mouse click; a user interest dwell time; a voice selection, a pen click, a selection gesture, a pen gesture, dragging with a lasso, a bounding area and a rubber band rectangle.

37. The system of claim 32, wherein the set determination circuit is further configured to determine an additional display characteristic associated with the set of additional display elements, and the additional display characteristic is at least one of: a conditional, a tentative and a less salient attribute associated with the combined set of display elements.

38. The system of claim 37, wherein the additional display characteristic is at least one of: reduced color saturation; reduced intensity; italics, reduced internal contrast, reduced contrast from the background; blurring, reduced high frequencies and increased transparency.

39. The system of claim 32, wherein the specific spatial relationships includes the horizontal position of display elements from the initial set of display elements, relative to the left edge of a background rectangle over which the initial set of display elements is displayed.

40. The system of claim 32, wherein the specific spatial relationships includes a left to right ordering of all initial set of display elements on any given row.

41. The system of claim 32, wherein the specific spatial relationships includes the horizontal displacement between any pair of initial set of display elements on a given row.

42. The system of claim 32, wherein the specific spatial relationships includes the vertical position of display element from the initial set, relative to the top edge of a background rectangle over which the initial set of display elements is displayed.

43. The system of claim 32, wherein the specific spatial relationships includes a top to bottom ordering of all initial set of display elements on any given column.

44. The system of claim 32, wherein the specific spatial relationships includes the vertical displacement between any pair of initial set of display elements on a given column.

45. The system of claim 32, wherein the specific spatial relationships includes each initial set of display element sharing its column with neither more nor less than the same set of initial set of display elements as before.

46. The system of claim 32, wherein the initial set of display elements is comprised of at least one of: icons, windows, thumbnails, tiles and rectangles.

47. The system of claim 32, wherein the additional set of display elements is comprised of at least one of: icons, windows, thumbnails, tiles and rectangles.

48. The system of claim 47, wherein the additional set of display elements represent at least one of: a linked display element, a document, a uniform resource locator and a citation.

49. The system of claim 32, wherein the initial set of display elements is not the same as the additional set of display elements.

50. The system of claim 32, wherein the display elements of the combined set are selectable and the selected display elements are added to the initial set of display elements.

51. The system of claim 50, wherein the added display elements are associated with the initial display characteristic.

52. The system of claim 32, wherein the display elements are sorted based on meta-data.

53. The system of claim 32, wherein the transition from the initial display to the composite sorted display is presented with an animation.

54. The system of claim 53, wherein at the beginning of the animation each display element representing one of the combined set of display elements is initially positioned coincident with a selected display element.

55. The system of claim 32, wherein a display element from the additional set of display elements is selectable and changes set membership in at least one of these ways: becomes a member of the initial set of display elements and ceases to be a member of the initial set of display elements based on the selection.

56. A computer readable storage medium storing code for execution on a computer system to perform the method of claim 1.

57. The system of claim 32, wherein the sorted context is determined by sorting display elements into categories, assigning an order to the categories, and displaying the categories in non-overlapping rectangles on at least one of: a screen, a display buffer and a virtual canvas.

58. The system of claim 57, wherein at least one information item is associated with a plurality of categories, with one display element for each category to which the information item is assigned.

59. The system of claim 57, wherein the set determination circuit is further configured to determine the categories by metadata attributes of the information item associated with each display elements.

60. The system of claim 59, wherein the meta-data attributes are at least one of: a title, an author, a publication date and a file name.

61. The system of claim 57, wherein the sorted context additionally consists of sorting the display elements within each section according to metadata attributes of the associated information item.

62. The system of claim 61, wherein the meta-data attributes are at least one of: a title, an author, a publication date and a file name.

63. The system of claim 46, wherein the display elements represent at least one of: a linked item, a document, a uniform resource locator and a citation.

64. A user interface comprising: an input/output circuit for receiving a user query; a search system that searches an information repository for display elements stored in the information repository matching the user query; a display system that displays the matching display elements based on the system for displaying linked information of claim 32.

65. The user interface of claim 64, wherein the information repository is at least one of: a database; a file system; a server; and a document collection.

* * * * *